(No Model.)
E. P. FOLLETT.
TAILOR'S MEASURE.
No. 566,158. Patented Aug. 18, 1896.
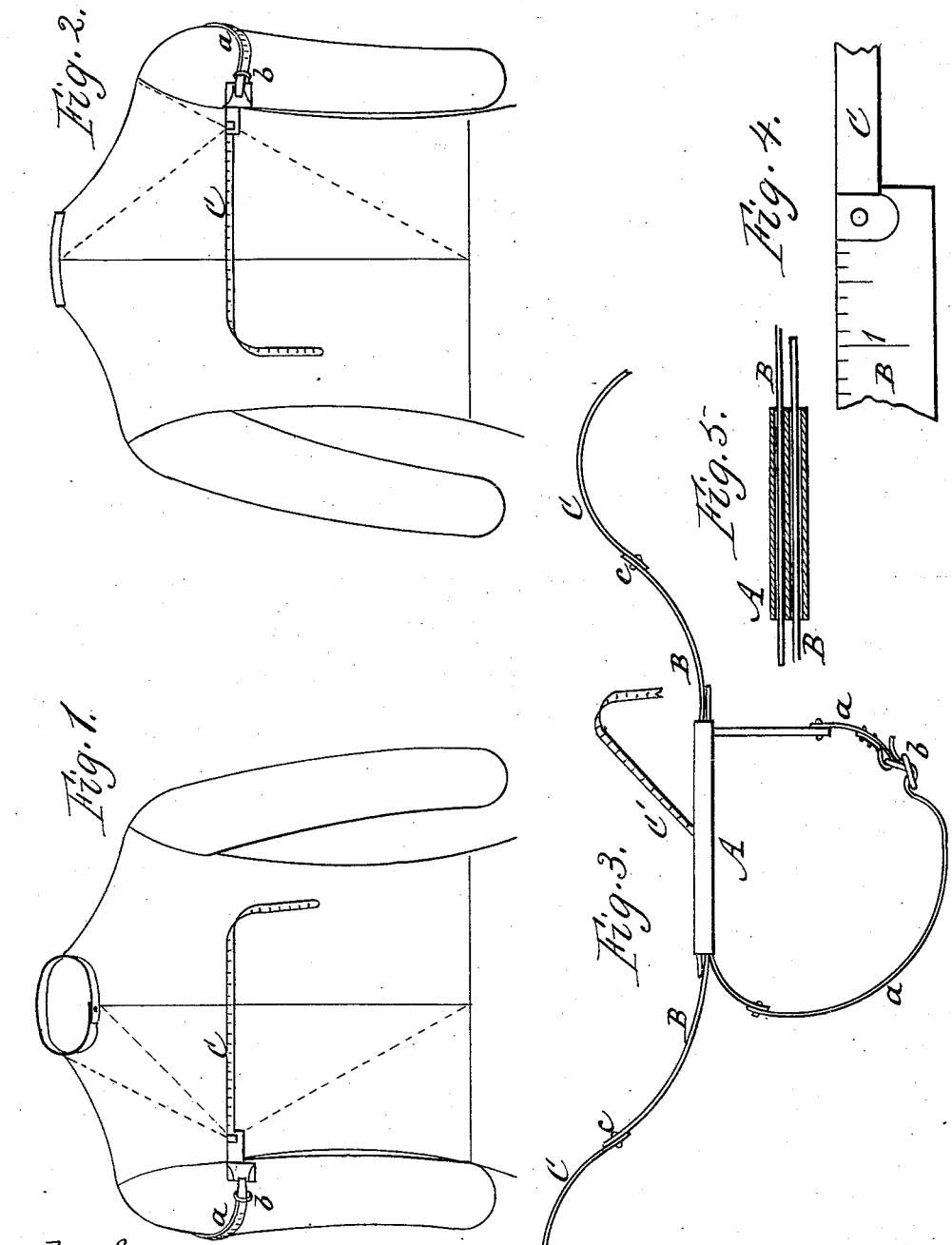

UNITED STATES PATENT OFFICE.

EDWARD P. FOLLETT, OF DULUTH, MINNESOTA.

TAILOR'S MEASURE.

SPECIFICATION forming part of Letters Patent No. 566,158, dated August 18, 1896.

Application filed December 23, 1895. Serial No. 572,999. (No model.)

*To all whom it may concern:*

Be it known that I, EDWARD P. FOLLETT, of Duluth, in the county of St. Louis and State of Minnesota, have invented a certain new and useful Improvement in Tailors' Measures; and I do hereby declare that the following is a full, clear, and exact description of the same, reference being had to the drawings accompanying this application.

My improvement relates to an instrument to be attached to the arm provided with slides movable out and in to fit the side of the body and tape-measures attached to the slides adapted to be swung to different positions to take measurements.

The invention consists in the combination and arrangement of parts hereinafter described and claimed.

In the drawings, Figure 1 is a front elevation of a form with the instrument applied. Fig. 2 is a rear elevation of the same. Fig. 3 is an enlarged plan view of the instrument. Fig. 4 is an enlarged elevation of the end of one of the slides with the tape attached. Fig. 5 is a detail view.

In this invention a clasp A is used, provided with straps *a a* and a buckle *b*, by which it can be clamped around the arm close up to the armpit. In the body of the clasp are two spring-slides B B, which slide past each other in opposite directions and are movable out and in. These slides are curved so as to fit closely to the side of the body on opposite sides of the arm, and are preferably marked with a scale of inches, as shown in the face view, Fig. 4.

C C are two tape-measures attached, respectively, to the ends of the two slides by pivots *c c*, which allow them to swing up and down without kinking or twisting.

C' is another tape-measure attached to the under side of the clasp A and designed for measuring vertical distances.

This instrument is designed for locating the points of measurement in laying out patterns for garments, and is of that nature where tapes attached at a fixed point swing from that point to measure at the center of the bust, the waist, the neck, and the shoulder-line. The full lines in Figs. 1 and 2 show the tapes carried in a straight line, respectively, to the center of the breast and back. The dotted lines in the same figures show the positions of the tapes radiating at different angles to meet the waist, the neck, and the shoulder lines. The movement of the spring-slides B B in and out is to bring the starting-point of the tape measurement in the same relative position in persons of different sizes; also, to bring such point out away from contact with the arm, which is much larger in some persons than in others; also, to carry such point past any irregularity in shape of the side of the person. These slides by always resting in alinement preserve the same relation to each other at all adjustments.

This device is of service in making measurements for all kinds of garments where the measurements have to be made from a given point at different radii over the front and back of the body.

Having described my invention, what I claim as new, and desire to secure by Letters Patent, is—

1. The instrument herein described, consisting of a clasp to embrace the arm, a slide movable forward and back therein to fit the side of the body, and a tape-measure attached to the slide and capable of being swung to different angles, as described.

2. The instrument herein described, consisting of a clasp to embrace the arm, two slides movable forward and back therein to fit the body on each side of the arm, and two tape-measures attached to the slides and capable of being swung to different positions on the front and back of the body, as herein shown and described.

3. The instrument consisting of a clasp to embrace the arm, a spring-slide of curved form to fit the body, and a tape-measure attached thereto, capable of being used at different angles from a given point on the slide, as herein shown and described.

In witness whereof I have hereunto signed my name in the presence of two subscribing witnesses.

EDWARD P. FOLLETT.

Witnesses:
R. F. OSGOOD,
CHAS. A. WIDENER.